(12) United States Patent
Heo et al.

(10) Patent No.: US 9,660,287 B2
(45) Date of Patent: May 23, 2017

(54) APPARATUS FOR PREVENTING DEFORMATION OF FUEL CELL STACK

(71) Applicant: Hyundai Motor Company, Seoul (KR)

(72) Inventors: Yong Suk Heo, Seoul (KR); Jung Do Suh, Seoul (KR); Duck Whan Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/827,886

(22) Filed: Aug. 17, 2015

(65) Prior Publication Data

US 2017/0054174 A1    Feb. 23, 2017

(51) Int. Cl.
*H01M 2/00* (2006.01)
*H01M 8/249* (2016.01)
*H01M 8/248* (2016.01)

(52) U.S. Cl.
CPC ........... *H01M 8/249* (2013.01); *H01M 8/248* (2013.01); *H01M 2250/20* (2013.01)

(58) Field of Classification Search
CPC ....................................................... H01M 2/00
See application file for complete search history.

(56) References Cited

U.S. PATENT DOCUMENTS

2013/0337364 A1*  12/2013  Burmeister ........... H01M 8/247
                                                    429/469
2014/0106254 A1*  4/2014  Yamano ............... H01M 8/2465
                                                    429/465

FOREIGN PATENT DOCUMENTS

| JP | H1083826 A | 3/1998 |
|---|---|---|
| JP | 2006-040845 A | 2/2001 |
| JP | 2001-068140 A | 3/2001 |
| JP | 2005-142145 A | 6/2005 |
| JP | 2013-182818 A | 9/2013 |
| KR | 10-2001-0057896 A | 7/2001 |
| KR | 2007-0018152 A | 2/2007 |
| KR | 2008-0090861 A | 10/2008 |
| KR | 2011-0007341 A | 1/2011 |

* cited by examiner

*Primary Examiner* — Jacob Marks
(74) *Attorney, Agent, or Firm* — Mintz Levin Cohn Ferris Glovsky and Popeo, P.C.; Peter F. Corless

(57) ABSTRACT

An apparatus for preventing deformation of a fuel cell stack is provided. The apparatus includes a support unit, respective ends of which are connected to first endplates of a pair of stacked fuel cell stacks. The apparatus further includes a support protrusion that protrudes from a surface of the support unit and extends through a gap between the pair of fuel cell stacks.

8 Claims, 9 Drawing Sheets

APPARATUS FOR PREVENTING DEFORMATION OF FUEL CELL STACK

BACKGROUND

Field of the Invention

The present invention relates to an apparatus for preventing deformation of a fuel cell stack, and more particularly to an apparatus for preventing deformation of a fuel cell stack caused by a side impact.

Description of the Related Art

A typical fuel cell stack for a vehicle includes a plurality of fuel cells in a stacked configuration and endplates 11 that fix and press against the stack of fuel cells at respective sides of the stack of fuel cells. FIG. 1 is a diagram illustrating a fuel cell stack according to the related art. In this fuel cell stack, endplates 11 protect and press against a stack of fuel cells to prevent the fuel cells from collapsing while remaining stacked. Additionally, attachment bars 12 are fixed to the endplates 11 at respective ends thereof, thereby offering a pull force to the endplates 11. The endplates 11 press against the fuel cells by being pressed by the attachment bars 12 (e.g., force exerted onto the endplates by the attachment bars).

The related art discloses a fuel cell stack for a vehicle according to a related art. The fell cell stack includes a multi-layer-type unit module connected to a common distribution device. In addition, a pair of fixing modules is attached to respective sides of a stack of fuel cells and each module includes a current collecting plate, an insulating plate, and an endplate that are superimposed on another. In this state, a plurality of bands, extending in a longitudinal direction, are fixed to the stack of fuel cells. Respective ends of each band are attached to the endplates using an attachment device (e.g., a type of fastener). However, as illustrated in FIG. 1, although the structure of the related art includes the endplates 11 disposed at respective ends of a stack of fuel cells, the structure does not include protective members that protect side portions of the stack of fuel cells. Accordingly, when an external load is applied to this fuel cell stack, i.e., when a vehicle vibrates due to unevenness in a road or when an impact attributable to a vehicle accident is applied to a vehicle, the fuel cell stack 10 may be easily deformed.

The foregoing is intended merely to aid in the understanding of the background of the present invention, and is not intended to mean that the present invention falls within the purview of the related art that is already known to those skilled in the art.

SUMMARY

Accordingly, the present invention provides an apparatus for preventing deformation of a fuel cell stack, which may prevent deformation of a fuel cell stack even when an external impact load is applied to the fuel cell stack by protecting side portions of each fuel cell stack and by increasing a combining force between the fuel cell stacks.

According to one aspect, an apparatus for preventing deformation of a fuel cell stack may include: a support unit respective ends of which may be connected to first endplates provided to first sides of a pair of stacked fuel cell stacks; and a support protrusion that protrudes from a surface of the support unit and extends through a gap between the pair of fuel cell stacks.

The support unit may extend toward second sides of the fuel cell stacks. Additionally, corners of a second end of the support unit may be fixed to respective second endplates of the pair of stacked fuel cell stacks. The support protrusion may be unified with the support unit and extend along the entire length of the support unit. The support protrusion may be disposed between the fuel cell stacks and may be in contact with both of the fuel cell stacks, thereby maintaining a preset gap between the pair of fuel cell stacks.

Further, the second endplates of the pair of fuel cell stacks may protrude to the exterior more than the first endplates. A front end of the support unit may be connected to the first endplates in a horizontal direction of the first endplates. A rear end of the support unit may be connected to the support protrusion in a perpendicular direction of the second endplates. Additionally, corners of the rear end of the support unit may include respective pins that protrude toward the support protrusions and the second endplates may include respective insertion bore that correspond to the pins. The corners of the rear end of the support unit may be connected to the support protrusions using bolts.

The support unit may extend to the second side of the fuel cell stack. A pin may protrude from the second side of the fuel cell stack. The second endplates disposed at the second ends of the pair of fuel cell stacks may protrude more than the first endplates disposed at first ends of the pair of fuel cell stacks, forming respective protruding portions thereof. An insertion bore may be formed in a position at which the protruding portions face each other to insert the pin into the insertion bore in a direction from the second sides of the fuel cell stacks. The front and rear ends of the support unit may be connected to the first and second endplates, respectively, using bolts.

According to the apparatus for preventing deformation of a fuel cell stack having the structure described above, it may be possible to increase resistance against twisting and bending of a support unit by using a support protrusion, thereby increasing resistance against deformation of a fuel cell stack. Since the support unit supports side portions of a fuel cell stack, it may be possible to suppress deformation of a fuel cell stack caused by a side impact. In addition, it may be possible to prevent fuel cells in a fuel cell stack from being scattered, thereby preventing a leak of hydrogen from the fuel cells.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
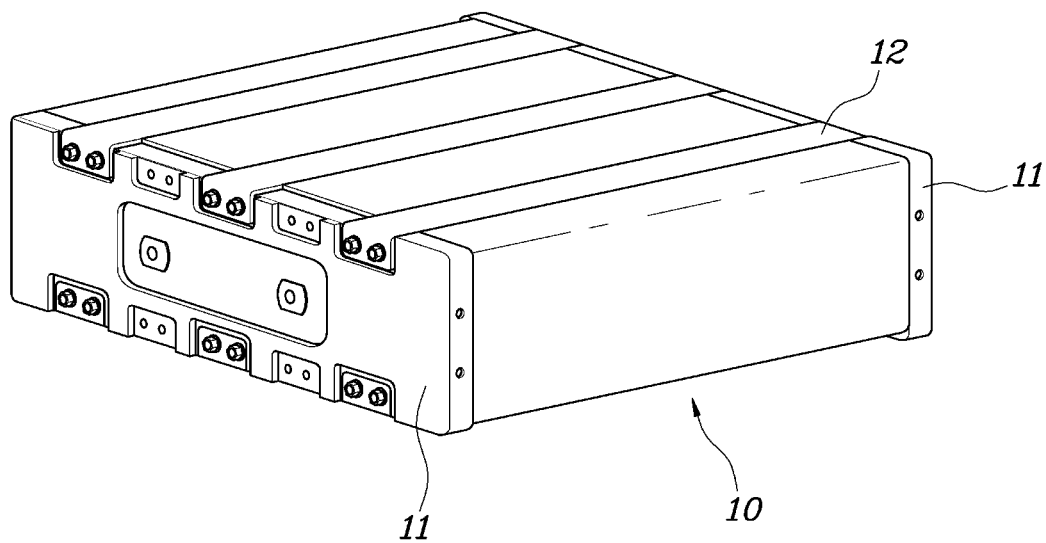
FIG. 1 is a diagram illustrating the construction of a fuel cell stack according to a related art.

Hereinafter, an apparatus for preventing deformation of a fuel cell stack will be described with reference to preferred embodiments.

FIGS. 2A to 2D are diagrams illustrating an apparatus for preventing deformation of a fuel cell stack according to a first exemplary embodiment. The apparatus according to the first exemplary embodiment may include a support unit 200 and a support protrusion 219. The corners of a first end of the support unit 200 may be attached to respective first endplates 110 of fuel cell stacks 100 that are paired with each other. The support protrusion 210 protrudes from a surface of the support unit 200 and extends through a gap between the pair of fuel cell stacks 100. The combined structure of the support protrusion 210 and the support unit 200 may form a "T" shape in a cross-section thereof. This structure may enhance or improve the strength of the support unit 200 and enable the pair of fuel cell stacks 100 to be stably combined by surrounding corners of the pair of fuel cell stacks 100 that face each other.

Figure 2A:
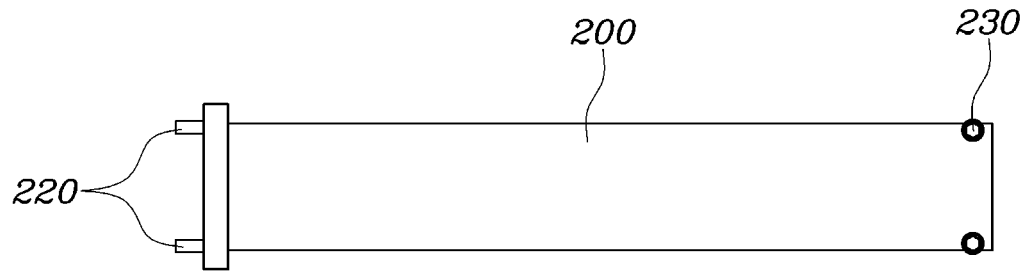
FIGS. 2A to 2D are diagrams illustrating an apparatus for preventing a fuel cell stack according to a first exemplary embodiment.
Figure 2B:
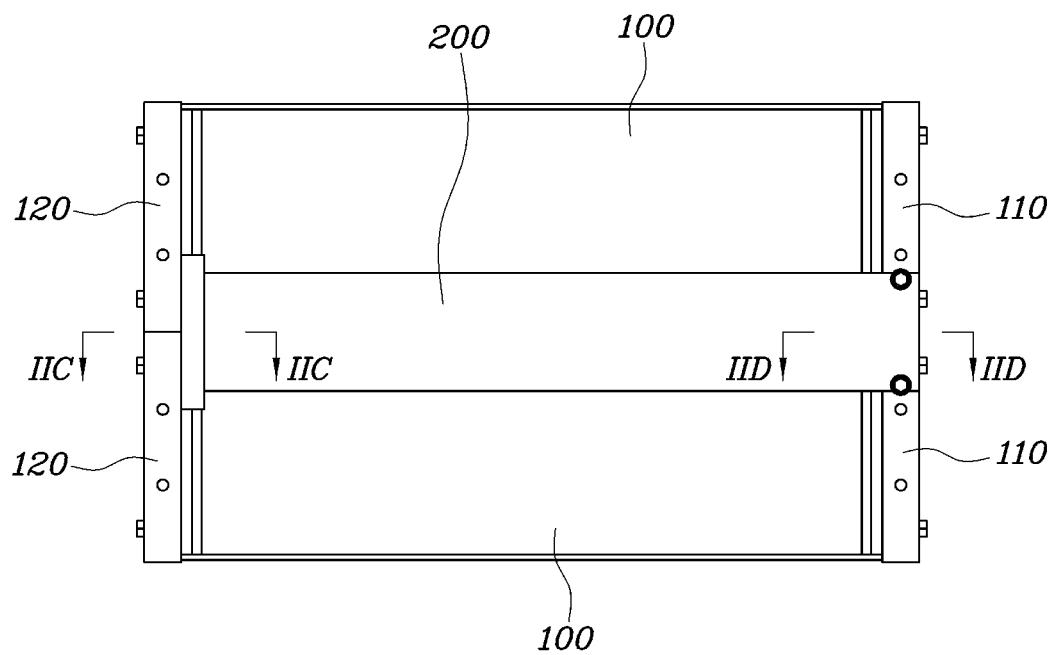
Figure 2C:
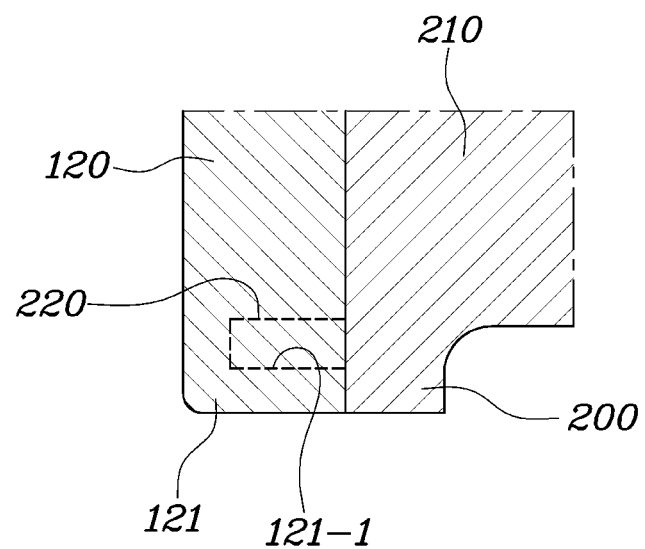
Figure 2D:
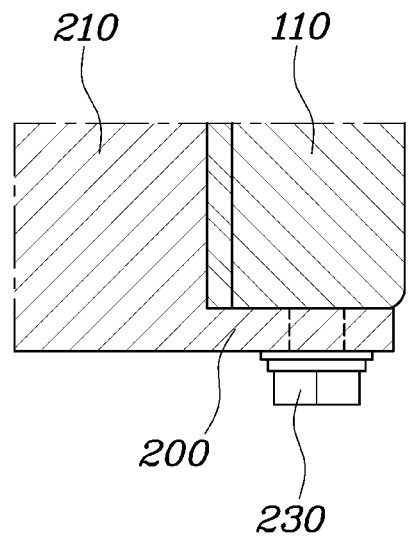

The apparatus for preventing deformation of a fuel cell stack according to the first exemplary embodiment will be described below in greater detail. FIG. 2C is a cross-sectional view of a fuel cell stack, taken along a line IIC-IIC of FIG. 2B. FIG. 2D is a cross-sectional view of the fuel cell stack, taken along a line IID-IID of FIG. 2B. FIG. 2A is a plan view of the support unit 200. The corners of a first end of the support unit 200 may be attached to outer surfaces of the respective fuel cell stacks 100. The support unit 200 extends from one end (e.g., a first end) of the fuel cell stack 100 to the opposite end (e.g., a second end) of the fuel cell stack 100. The corners of a second end of the support unit 100 may be attached to respective second endplates 120 of the pair of fuel cell stacks 100.

Further, the support unit 200 may have a panel shape and may have a front end attached to the first endplates 110 and a rear end attached to the second endplates 120. The corners of the front end of the support unit 200 may be attached to the respective first endplates 110 of the pair of fuel cell stacks 100 and the corners of the rear end of the support unit 200 may be attached to the respective second endplates 120 of the pair of fuel cell stacks 100. Accordingly, the support unit 200 may support the side portions of the pair of fuel cell stacks 100 to thus prevent an external impact load from being applied to the fuel cell stacks 10 during a side impact. In other words, it may be possible to prevent the fuel cell stacks from being displaced from original positions by the side impact. The term "side portions" refers to respective sides of the fuel cell stack 100 when a direction in which fuel cells are stacked is a vertical direction of the fuel cell stack 100.

The support protrusion 210 may be integrated with the support unit 200 (e.g., may be formed integrally with) and may extend along the length of the support unit 200. The support protrusion 210 may also increase the total strength of the support unit 200. In other words, the strength of the support unit 200 may be increased compared to a conventional plate member even when the length thereof is greater than a conventional plate member. In addition, the protrusions 210 may be in contact with the respective stacked fuel cell stacks 100 while disposed between the pair of fuel cell stacks 100. The pair of fuel cell stacks 100 may be supported by the support protrusions 210 and thus the gap between the fuel cell stacks 100 may be maintained.

Figure 3:
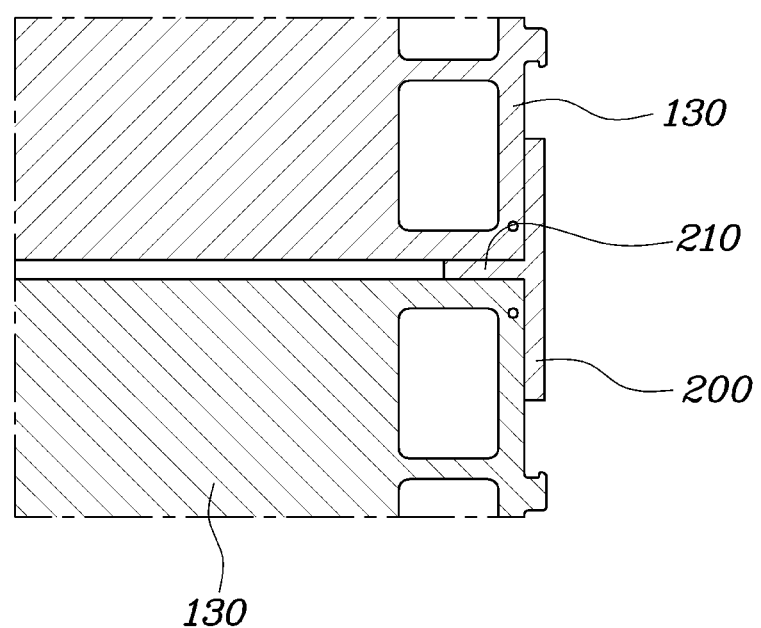
FIG. 3 is a cross-sectional view illustrating the apparatus for preventing deformation of the fuel cell stack according to the first exemplary embodiment.

FIG. 3 is a cross-sectional view illustrating the apparatus for preventing deformation of a fuel cell stack according to the first exemplary embodiment. FIG. 3 illustrates a state in which the support unit 200 is in contact with the fuel cell stacks 100. As illustrated in FIG. 3, the fuel cell stacks 100 may be stacked in a vertical direction. However, the direction in which the fuel cell stacks 100 are stacked is not limited thereto.

As illustrated in FIG. 3, the support unit 200 may be in contact with outer surfaces of the fuel cell stacks 100. Particularly, the support unit 200 may be in tight contact with (e.g., may abut) an outer surface of a separation plate 130. The support protrusions 210 may also abut the outer surface of the separation plate 130. The preset gap between the fuel cell stacks 100 may be maintained to prevent a risk of the pair of fuel cell stacks 100 being in contact with each other due to weight or collapsing of the fuel cells even when an impact is applied to the fuel cell stacks 100. The width of the support protrusion 210 may be set such that the preset gap may be maintained. Since the gap may be maintained, when any one fuel cell stack of the pair of fuel cell stacks 100 is deformed, it may be possible to prevent the remaining fuel cell stack 100 from being deformed.

The second endplates of the pair of fuel cell stacks 100 may protrude more than the first endplates 110 (e.g., may protrude further than), forming protruding portions 121. Further, the front end of the support unit 200 may be attached to a surface of the first endplate 110 in a lateral direction of the first endplate 110, and the rear end of the support unit 200 may be attached to the protruding portion 121 in a direction perpendicular to the surface of the second endplate 120. FIG. 2C is a cross-sectional view illustrating a state in which the rear end of the support unit 200 is attached to the protruding portion 121. FIG. 2D is a cross-sectional view illustrating a state in which the front end of the support unit 200 is attached to the first endplate 110. FIG. 2A is a top plan view of the support unit 200.

Moreover, the protruding portion 121 may be formed to extend along the length of the second endplate 120. The front and rear ends of the support unit 200 may be respectively attached to the endplates that are perpendicular to each other. Therefore, the support unit 200 may be supported in its lateral direction (e.g., longitudinal direction) and perpendicular direction. Therefore, the support unit 200 may not be separated from the fuel cell stacks 100 and may be stably combined with the fuel cell stacks 100 even when an impact load is applied to the fuel cell stacks in all directions.

To combine (e.g., link, attach, adhere, connect, etc.) the second endplate 120 and the support unit 200, the corners of the rear end of the support unit 200 may include a pair of pins 220 which protrude toward the protruding portion 121, and the second endplates 120 of the pair of fuel cell stacks 100 may include insertion bores 121-1 in positions that correspond to the pins 220 to insert the pins 200 from the second side of the fuel cell stack 100. The rear end of the support unit 200 may be bent toward the protruding portion 212 and may be in parallel contact with the protruding portion 121. Accordingly, the support unit 200 may be supported in the longitudinal direction thereof. The rear end of the support unit 200 and the second endplate 120 may be connected by inserting the pins 220 into the insertion bores 121-1. Accordingly, production productivity of the fuel cell stacks may be increased. In particular, the runt end of the support unit 200 may be connected to the fist endplate 110 using a bolt.

Figure 4A:
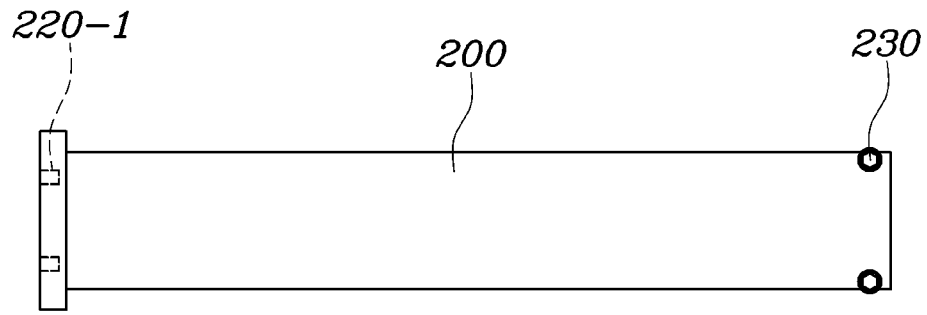
FIGS. 4A to 4D are diagrams illustrating an apparatus for preventing deformation of a fuel cell stack according to a second exemplary embodiment.
Figure 4B:
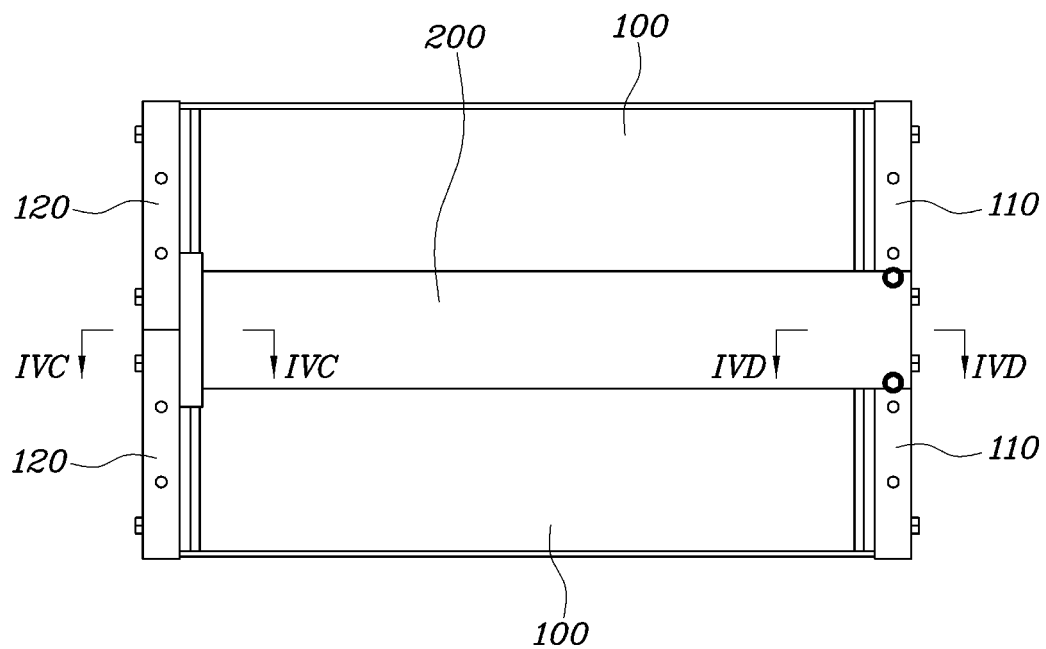
Figure 4C:
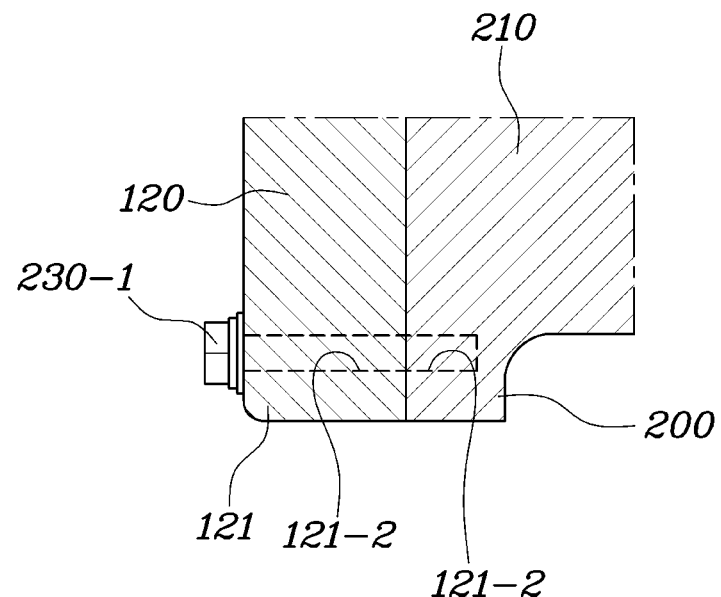
Figure 4D:
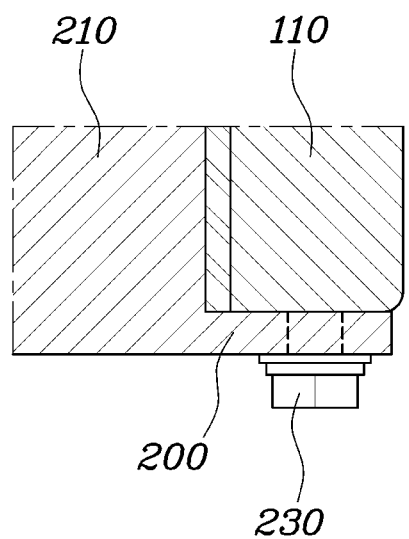

FIGS. 4A to 4D illustrate an apparatus for preventing deformation of a fuel cell stack according to a second exemplary embodiment. FIG. 4C is a cross-sectional view which is taken along a line IVC-IVC of FIG. 4B and illustrates a state in which a rear end of a support unit 200 is connected to a protruding portion 121. FIG. 4D is a cross-sectional view which is taken along a line IVD-IVD of FIG. 4B and illustrates a state in which a front end of the support unit 200 is connected to a first endplate 110. FIG. 4A is a plan view of the support unit 200. The second exemplary embodiment differs from the first exemplary embodiment in that the rear end of the support unit 200 may be connected to the protruding portion 121 using bolts 230-1. In the second exemplary embodiment, apertures 121-2 may be formed instead of the insertion bores 121-1. In addition, the bolts 230-2 may be inserted to pass through the apertures 121-2 and connected to the rear end of the support unit 200 which may be bent. Further, connection bores 220-1 may be formed in the rear end of the support unit 200 to allow the bolts 230-1 to be inserted into the connection bores 220-1. The support unit 200 may be connected to the protruding portion 121 when the bolts 230-1 are inserted to pass through the rear end of the support unit 200.

Figure 5A:
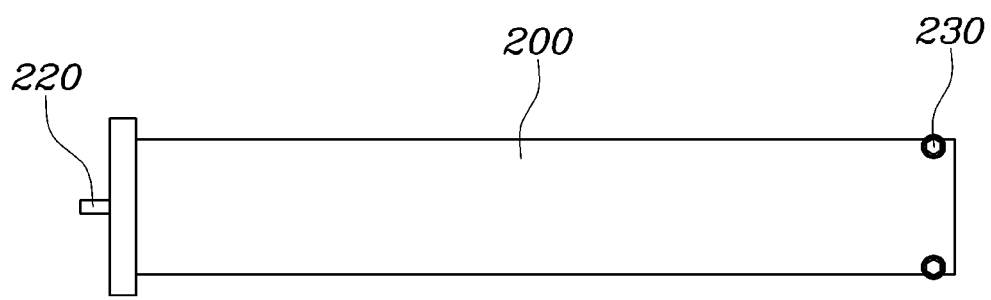
FIGS. 5A to 5D are diagrams illustrating an apparatus for preventing deformation of a fuel cell stack according to a third exemplary embodiment.
Figure 5B:
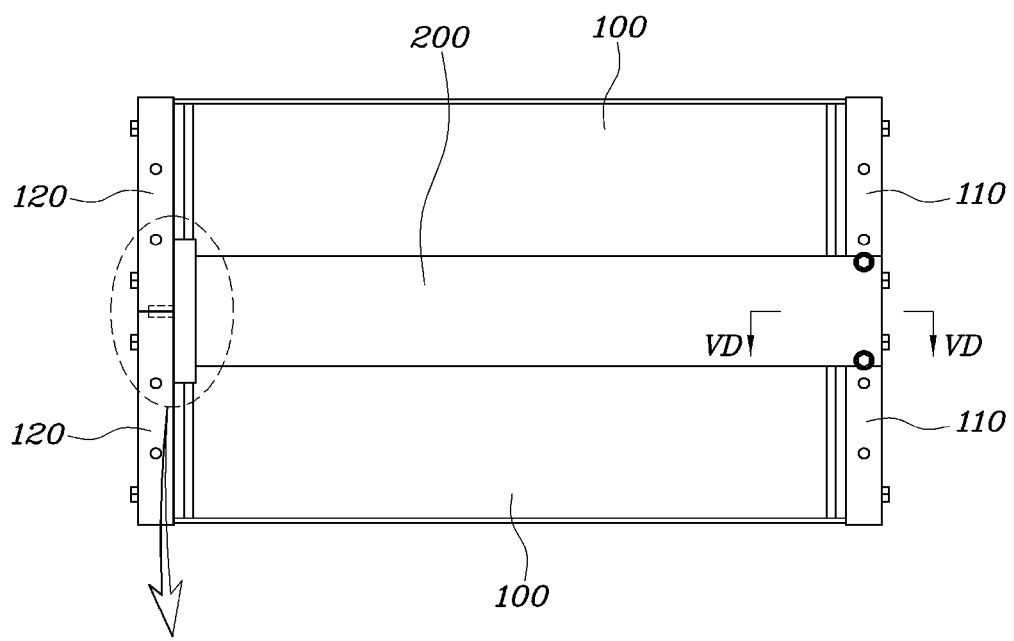
Figure 5C:
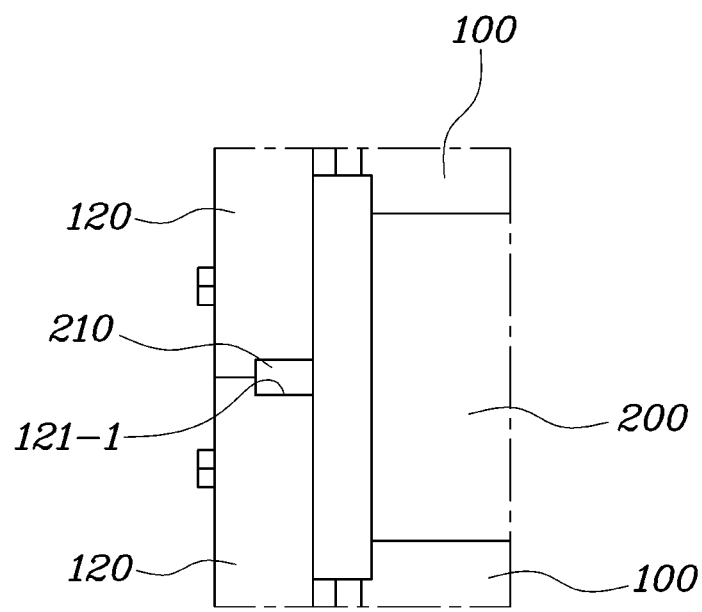
Figure 5D:
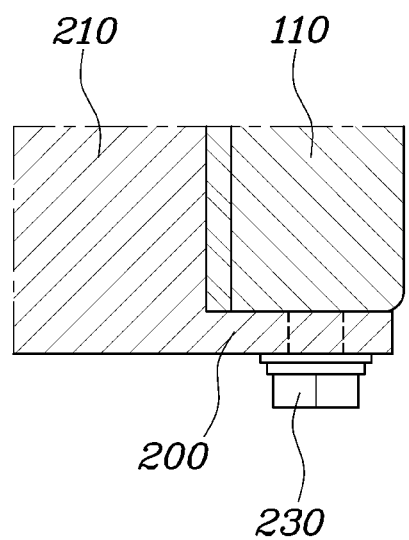

FIGS. 5A to 5D illustrate an apparatus for preventing deformation of a fuel cell stack according to a third exemplary embodiment. FIG. 5C is a cross-sectional view illustrating a state of a fuel cell stack in which a rear end of a support unit 200 is connected to a protruding portion 121. FIG. 5D is a cross-sectional view which is taken along a line VD-VD and illustrates a state of the fuel cell stack in which a front end of the support unit 200 is connected to a first endplate 110. FIG. 5A is a plan view of the support unit 200. The apparatus according to the third exemplary embodiment differs from the first embodiment in that one pin 220 and one insertion bore 121-1 are necessary unlike the first exemplary embodiment in which two pins 220 and two insertion bores 121-1 are necessary.

In particular, second endplates 120 of a pair of fuel cell stacks may be in contact with each other. In addition, the insertion bore 121-1 may be formed in a position at which protruding portions 121 are arranged to be in contact with each other. The insertion bore 121-1 may be formed in a second side surface of the fuel cell stack 100. In other words, as illustrated in FIGS. 5A to 5D, the insertion bore 121-1 may be formed to connect the protruding portions 121 with each other to surround the pin 220. Alternatively, the protruding portions 121 may not be in contact with each other. In particular, the insertion bore 121-1 may be formed in a position at which the protruding portions 121 face each other. Since the pin 220 may be disposed at a position when the protruding portions 121 are in contact with each other, the rear end of the support unit 200 may be fixed to the protruding portions using one pin 220. Therefore, it may be possible to reduce cost and assembly time. The front end of the support unit 200 may be horizontally fixed to the first endplate 110 as in the first exemplary embodiment.

Figure 6A:
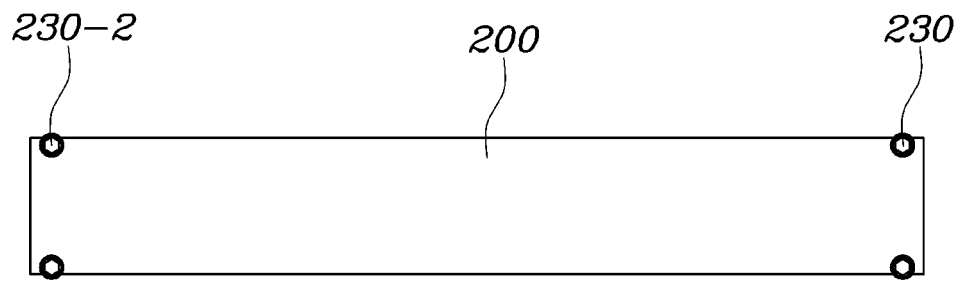
FIGS. 6A to 6D are diagrams illustrating an apparatus for preventing deformation of a fuel cell stack according to a fourth exemplary embodiment.
Figure 6B:
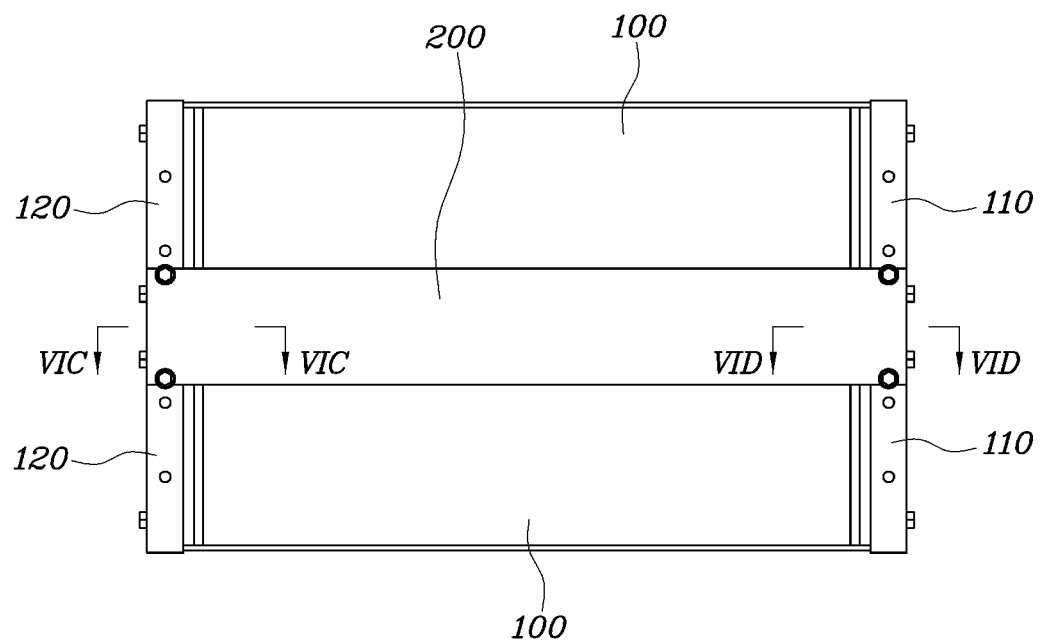
Figure 6C:
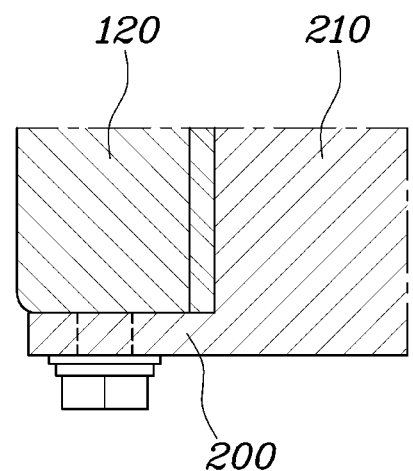
Figure 6D:
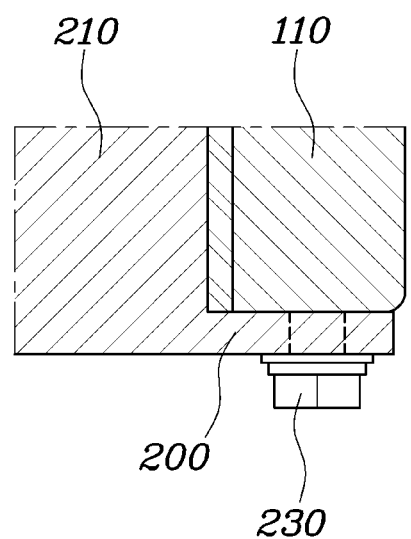

FIGS. 6A to 6D illustrate an apparatus for preventing deformation of a fuel cell stack according to a forth exemplary embodiment. FIG. 6C is a cross-sectional view which is taken along a line VIC-VIC of FIG. 6B and illustrates a state of a fuel cell stack in which a rear end of a support unit 200 is connected to a protruding portion 121. FIG. 6D is a cross-sectional view which is taken along a line VID-VID and illustrates a state of the fuel cell stack in which a front end of the support unit 200 is connected to a first endplate 110. FIG. 6A is a plan view of the support unit 200.

In the fourth exemplary embodiment, the front and rear ends of the support unit 200 may be horizontally connected to a first endplate 110 and a second endplate 120, respectively using bolts. In other words, according to the fourth exemplary embodiment, the protruding portion 121 is not formed unlike the first to third exemplary embodiments. In addition, the rear end of the support unit 200 may be connected in the same manner as the connection between the front end of the support unit and the first endplate 110 according to the first to third exemplary embodiments.

According to the apparatus for preventing deformation of a fuel cell stack described above, since the support protrusion 210 may increase resistance against twisting and bending of the support unit 200, deformation resistance of the fuel cell stack 100 may be increased. In addition, since the support unit 200 may support side portions of the fuel cell stack 100, it may be possible to prevent deformation of the fuel cell stack caused by a side impact. In addition, even when a side impact occurs, it may be possible to prevent fuel cells from being detached from the fuel cell stack, thereby preventing a leak of hydrogen from the fuel cells.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for preventing deformation of a fuel cell stack, comprising:
    a support unit respective ends of which are connected to first endplates provided to first sides of a pair of stacked fuel cell stacks; and
    a support protrusion that protrudes from a surface of the support unit and extends through a gap between the pair of stacked fuel cell stacks,
    wherein the support unit extends toward second sides of the fuel cell stacks, and wherein corners of a second end of the support unit are fixed to respective second endplates of the pair of stacked fuel cell stacks, and
    wherein the second endplates of the pair of fuel cell stacks protrude further than the first endplates, a front end of the support unit is connected to the first endplates in a horizontal direction of the first endplates, and a rear end of the support unit is connected to the support protrusion in a perpendicular direction of the second endplates.

2. The apparatus according to claim 1, wherein the support protrusion is integrated with the support unit and extends along the length of the support unit.

3. The apparatus according to claim 1, wherein the support protrusion is disposed between the fuel cell stacks and is in contact with both of the fuel cell stacks to maintain a preset gap between the pair of fuel cell stacks.

4. The apparatus according to claim 1, wherein corners of the rear end of the support unit include respective pins that protrude toward the support protrusions, and the second endplates include respective insertion bores in positions that correspond to the pins.

5. The apparatus according to claim 1, wherein corners of the rear end of the support unit are connected to the support protrusions using bolts.

6. The apparatus according to claim 1, wherein the support unit extends to the second side of the fuel cell stack, a pin protrudes from the second side of the fuel cell stack, the second endplates disposed at the second ends of the pair of fuel cell stacks protrude further than the first endplates disposed at first ends of the pair of fuel cell stacks, forming respective protruding portions thereof, and an insertion bore is formed in a position where the protruding portions face each other to insert the pin into the insertion bore in a direction from the second sides of the fuel cell stacks.

7. The apparatus according to claim 1, wherein the front and rear ends of the support unit are connected to the first and second endplates, respectively, using bolts.

8. A fuel cell vehicle having an apparatus for preventing deformation of a fuel cell stack according to claim 1.

* * * * *